(12) United States Patent
Sarmaala

(10) Patent No.: US 8,340,489 B2
(45) Date of Patent: Dec. 25, 2012

(54) DEVICE AND METHOD FOR ADJUSTING A POSITION OF AN OPTICAL COMPONENT

(75) Inventor: Jarkko Sarmaala, Turku (FI)

(73) Assignee: PerkinElmer Singapore Pte. Ltd., Singapore (SG)

(*) Notice: Subject to any disclaimer, the term of this patent is extended or adjusted under 35 U.S.C. 154(b) by 411 days.

(21) Appl. No.: 12/808,004

(22) PCT Filed: Dec. 11, 2008

(86) PCT No.: PCT/FI2008/050725
§ 371 (c)(1),
(2), (4) Date: Jun. 14, 2010

(87) PCT Pub. No.: WO2009/074718
PCT Pub. Date: Jun. 18, 2009

(65) Prior Publication Data
US 2010/0266252 A1     Oct. 21, 2010

(30) Foreign Application Priority Data

Dec. 12, 2007 (FI) ................................ 20070971
Jan. 22, 2008 (FI) ................................ 20080053

(51) Int. Cl.
*G02B 6/00* (2006.01)
(52) U.S. Cl. ........................... 385/134; 359/896
(58) Field of Classification Search ............ 385/134, 385/135, 136, 137, 146, 147
See application file for complete search history.

(56) References Cited

U.S. PATENT DOCUMENTS

| | | | | |
|---|---|---|---|---|
| 4,228,699 A | * | 10/1980 | Adams | 477/50 |
| 5,095,807 A | * | 3/1992 | Wagenseil | 92/12.2 |
| 5,334,113 A | * | 8/1994 | Roepke | 482/106 |
| 5,380,095 A | * | 1/1995 | Pryor | 384/8 |
| 5,549,710 A | * | 8/1996 | Vera et al. | 623/38 |
| 5,659,645 A | | 8/1997 | Satake | |
| 5,722,299 A | * | 3/1998 | Yamamoto et al. | 74/493 |

(Continued)

FOREIGN PATENT DOCUMENTS

JP     1987-094803     5/1987

(Continued)

OTHER PUBLICATIONS

Japanese Office Action dated Feb. 22, 2012, corresponding JP 2010-537481.
International Search Report dated Mar. 17, 2009, from corresponding PCT application.

*Primary Examiner* — Akm Enayet Ullah
(74) *Attorney, Agent, or Firm* — Young & Thompson

(57) ABSTRACT

An bidirectional optical component position adjustment device includes a first member having a flat sliding surface, and a second member movable relative to the first member contacting the sliding surface. The optical component attaches to the second member. An elongated third member connects with the first and second members so the second member is movable relative to the first in a direction of a rotation axis of the third member when the third member is moved in the direction of its rotation axis. The rotation axis is substantially parallel to the sliding surface. The third member includes an eccentric part which is eccentric in relation to the rotation axis. The eccentric part is operationally connected with the second member so the second member moves relative to the first perpendicular to the rotation axis when the third member is rotated around its rotation axis. An optical adjustment method is also provided.

20 Claims, 2 Drawing Sheets

U.S. PATENT DOCUMENTS

| | | | |
|---|---|---|---|
| 6,382,149 B1 * | 5/2002 | Fischer et al. | 123/90.16 |
| 6,621,770 B2 * | 9/2003 | Kato | 369/44.14 |
| 6,918,336 B1 * | 7/2005 | Makino et al. | 92/79 |
| 6,959,638 B2 * | 11/2005 | Makino et al. | 91/503 |
| 7,522,483 B2 * | 4/2009 | Omori et al. | 369/44.14 |
| 2002/0079276 A1 | 6/2002 | Miyake | |
| 2006/0153698 A1 * | 7/2006 | Makino et al. | 417/269 |
| 2007/0270258 A1 | 11/2007 | Stanescu | |

FOREIGN PATENT DOCUMENTS

| | | |
|---|---|---|
| JP | 09-238235 | 9/1997 |
| JP | 2000-162482 | 6/2000 |
| JP | 2003-077825 | 3/2003 |

* cited by examiner

DEVICE AND METHOD FOR ADJUSTING A POSITION OF AN OPTICAL COMPONENT

TECHNICAL FIELD OF THE INVENTION

The present invention relates to a device and method for adjusting a position of an optical component in two directions according to the preamble of the appended independent claims.

BACKGROUND OF THE INVENTION

There exist various types of mechanisms for adjusting a position of an optical component, such as an optical fibre, a lens or a mirror, in an optical system. In some applications these adjustment mechanisms are used for aligning an optical axis of an optical component whereas in some cases e.g. for scanning purposes.

In the known devices for adjusting a position of an optical component in two directions there are typically provided two single-axis drive stages which are arranged to operate independently from each other. Thus, to move the optical component from one position to another, two separate adjusting means, such as screws, have to be controlled.

Document U.S. Pat. No. 5,659,645 discloses a collimator with an adjusting mechanism for an alignment between an optical fibre and a lens. In order to adjust the optical axis of the optical fibre, which is mounted on a ferrule within a receptacle, the adjusting mechanism is mounted on the periphery of the receptacle support to adjust the radial position of the receptacle. Four threaded bores extend radially through the receptacle support and are arranged in a circumferentially 90 degrees spaced relationship. Each adjusting mechanism includes a screw received in one of the two diametrically opposite threaded bores, a spring-loaded screw received in the other threaded bore, and a locking nut adapted to fix the screw in position. As the screw is radially moved toward and away from the receptacle, a pin of the spring-loaded screw located in a diametrically opposite relation to the screw is moved in a reciprocal fashion under the action of the spring. As a result, the optical fibre is moved in the cross directions along a plane extending at right angles to the axis of the receptacle.

A drawback of the mechanism disclosed in the aforementioned document and other known two-axial adjustment mechanisms is that their use is often time-consuming; for adjusting the position of the optical component at least two adjusting means must be controlled. Additionally, the known adjusting apparatuses have typically a complicated structure and are thus expensive to manufacture with the required high precision. Also not many of the known devices are capable for the purposes of both aligning and scanning.

DESCRIPTION OF THE INVENTION

It is the main objective of the present invention to reduce or even eliminate prior art problems presented above.

It is an objective of the invention to provide a device and method for adjusting a position of an optical component. In more detail, it is an objective of the invention to provide a device that can be used to adjust the position of the component in two dimensions in a simple manner. It is also an objective of the invention to provide a method for performing the adjustment in two dimensions in a simple manner. It is a further objective of the invention to provide a device that has a simple mechanical structure and is thus cheap to manufacture. It is a still further objective of the present invention to provide a device that enables fine adjustment of the position of the optical component to be performed quickly with good accuracy and reproducibility.

In order to realise the above-mentioned objectives, the device and method according to the invention are characterised by what is presented in the characterising part of the appended independent claims. Advantageous embodiments of the invention are described in the depending claims.

The exemplary embodiments of the invention presented in this text are not interpreted to pose limitations to the applicability of the appended claims. The verb "to comprise" is used in this text as an open limitation that does not exclude the existence of also unrecited features. The features recited in the depending claims are mutually freely combinable unless otherwise explicitly stated.

A typical device for adjusting a position of an optical component in two directions according to the invention comprises a first member having a flat sliding surface, and a second member arranged to be movable relative to the first member in contact with said sliding surface. The optical component is attachable to the second member. The device according to the invention also comprises an elongated third member arranged in an operational connection with the first and the second member so that the second member is movable relative to the first member in a direction of a rotation axis of the third member when the third member is being moved in the direction of its rotation axis. The rotation axis is arranged to be substantially parallel to the sliding surface of the first member.

In the device according to the invention the third member comprises an eccentric part which is eccentric in relation to the rotation axis of the third member. The eccentric part is arranged in an operational connection with the second member so that the second member is movable relative to the first member in a direction perpendicular to said rotation axis when the third member is being rotated around its rotation axis.

In other words, the present invention provides a device that enables adjusting the position of the optical component in two directions by using only a single actuator, i.e. the third member of the device according to the invention. By moving the third member along its rotation axis, the optical component (assuming that it has been attached to the device) moves in one direction, and by rotating the third member around its rotation axis the optical component moves in another direction, which another direction is perpendicular to the rotation axis. The rotational motion is converted into a linear motion via the eccentric part. Thus, the component can be moved along a plane which is defined by these two directions.

The adjustment range of the device according to the invention in the transverse direction depends on the eccentricity of the eccentric part relative to the rotation axis of the third member. The maximum allowable movement in the direction perpendicular to the rotation axis is directly proportional to the measure of eccentricity.

Exemplary dimensions for the device according to the invention are as follows. The length of the device is typically in the range of 10 to 250 mm, preferably in the range of 25 to 60 mm. The width of the device is typically in the range of 15 to 45 mm, preferably in the range of 20 to 30 mm. The height of the device is typically in the range of 4 to 20 mm, preferably in the range of 6 to 12 mm.

The first, the second and the third member can be produced, for example, by machining or by injection moulding from a plastic, such as PS, POM or PEEK. They can also be manufactured from a metal, such as aluminium or brass.

According to an embodiment of the invention the second member is a slide which is arranged to be movable along the flat sliding surface of the first member. By the flat surface it is meant a surface substantially without a curvature. The first member acts as a frame structure of the device. According to an embodiment of the invention the third member is a shaft comprising an eccentric part.

According to an embodiment of the invention the first member comprises an aperture through which the third member is movable. In a preferred embodiment of the invention the third member comprises a helical thread formed along a portion of the third member and the aperture comprises a corresponding helical groove so that the third member is movable through the aperture by rotating the third member around its rotation axis. The corresponding helical groove can be moulded, for example, by rotating the third member into the aperture.

The first member can comprise more than one aperture through which the third member can be moved. For example, the first member can have two apertures situated at the opposing edges of the first member. One or more of the apertures can have helical grooves.

The advantage of providing the third member with the helical thread is that the second member can be moved relative to the first member in two directions just by rotating the third member. By rotating the third member in the clockwise and/or counterclockwise direction, a sinusoidal movement of the second member relative to the first member is achieved. Therefore, it is easy and fast to adjust the optical component to a desired position simply by rotating the third member.

According to an embodiment of the invention the angle of thread is in the range of 0.05 to 10 degrees, preferably in the range of 0.1 to 6 degrees. By the angle of thread it is meant the angle occurring between the sides of the thread, measured in an axial plane. With a small angle of thread, a good accuracy can be achieved in the longitudinal direction.

Typically, the pitch of thread is in the range of 0.1 to 4 mm, preferably in the range of 0.2 to 0.5 mm. By the pitch of thread it is meant the distance that the thread advances in the longitudinal direction per every 360 degrees rotation. The movement of the second member relative to the first member in the longitudinal direction per each turn of the third member is the same as the pitch of thread.

According to an embodiment of the invention the length of the portion of the third member having the helical thread is in the range of 0.1 to 250 mm, preferably in the range of 1 to 20 mm. The diameter of the portion of the third member having the helical thread is typically in the range of 1.3 to 8 mm, preferably in the range of 2 to 6 mm.

According to an embodiment of the invention the device comprises an electric motor for rotating the third member in the clockwise and counterclockwise direction. By using the electric motor the adjustment process can be automated. For example, a computer program product can be used for controlling the electric motor. With a specific computer program the third member can be rotated in the clockwise and/or counterclockwise direction in order to perform a scanning operation.

According to an embodiment of the invention the second member comprises a groove inside which the eccentric part is arranged to be movable. Typically, the groove and the eccentric part are formed so that they are in an operational connection with each other without any substantial free play between them. According to a preferred embodiment of the invention the length of the eccentric part is substantially the same as the length of the groove.

In a preferred embodiment of the invention the eccentric part has a circular cross-section. In this case the bottom of the groove has preferably a semi-circular cross-section. In a preferred embodiment of the invention the diameter of the eccentric part is smaller than the average diameter of the third member.

Some exemplary dimensions for the eccentric part of the device according to the invention are as follows. The length of the eccentric part is typically in the range of 2 to 100 mm, preferably in the range of 4 to 20 mm. The diameter of the eccentric part is typically in the range of 2 to 8 mm, preferably in the range of 3 to 6 mm.

According to an embodiment of the invention the second member comprises attaching means for attaching the optical component to the second member. The optical component can be attached to the second member, for example, by using a ferrule or screws.

According to an embodiment of the invention the device comprises fastening means for fastening the first member in connection with the second member so that the second member stays in contact with the sliding surface. This can be accomplished, for example, with screws that are tightly connected to the first member, but with a loose fit to the second member so that the second member can move relative to the first member. Typically, the second member has apertures through which the screws are arranged which apertures are large enough for allowing the movement of the second member relative to the first member.

The present invention also concerns a use of a device according to the invention for adjusting the position of an end of an optical fibre. Other optical components that can be attached to the device are, for example, mirrors and lenses.

The invention further concerns a method for adjusting a position of an optical component in two directions with a device comprising a first member having a flat sliding surface, a second member arranged in contact with the sliding surface, and an elongated third member arranged in an operational connection with the first and the second member so that the second member is movable relative to the first member. The method comprises adjusting the optical component in a direction of a rotation axis of the third member by moving the third member in the direction of its rotation axis, the optical component being attached to the second member, and the rotation axis being substantially parallel to the sliding surface of the first member. The method also comprises adjusting the optical component in a direction perpendicular to the rotation axis by rotating the third member around its rotation axis and by converting the rotational motion into a linear motion via an eccentric part which is eccentric in relation to the rotation axis of the third member.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE DRAWINGS

Figure 1:
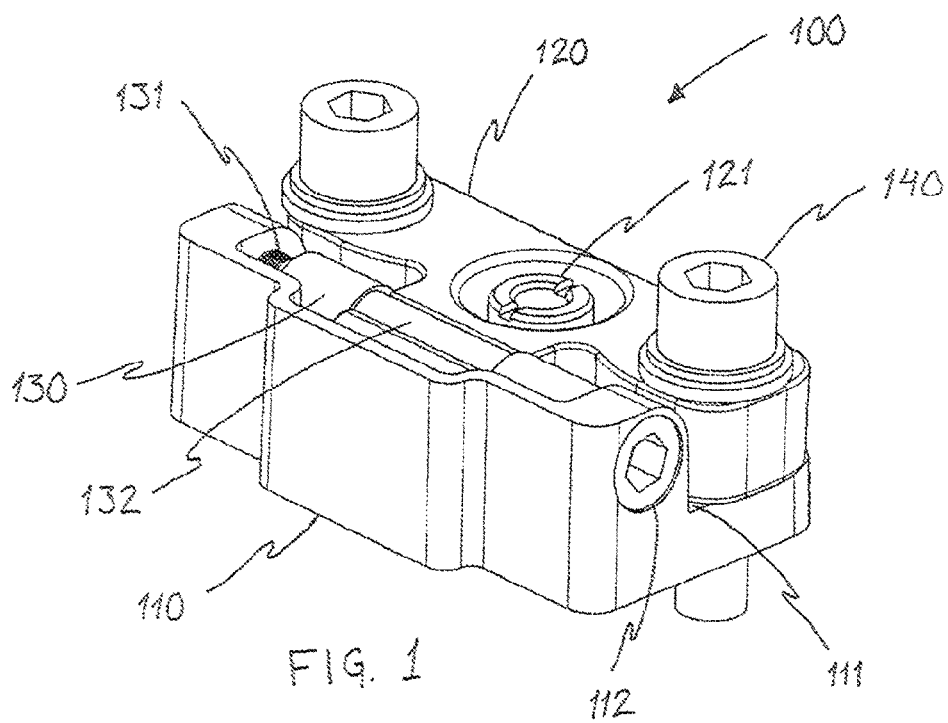
FIG. 1 illustrates a perspective view of a device for adjusting a position of an optical component according to an embodiment of the invention.
Figure 2:
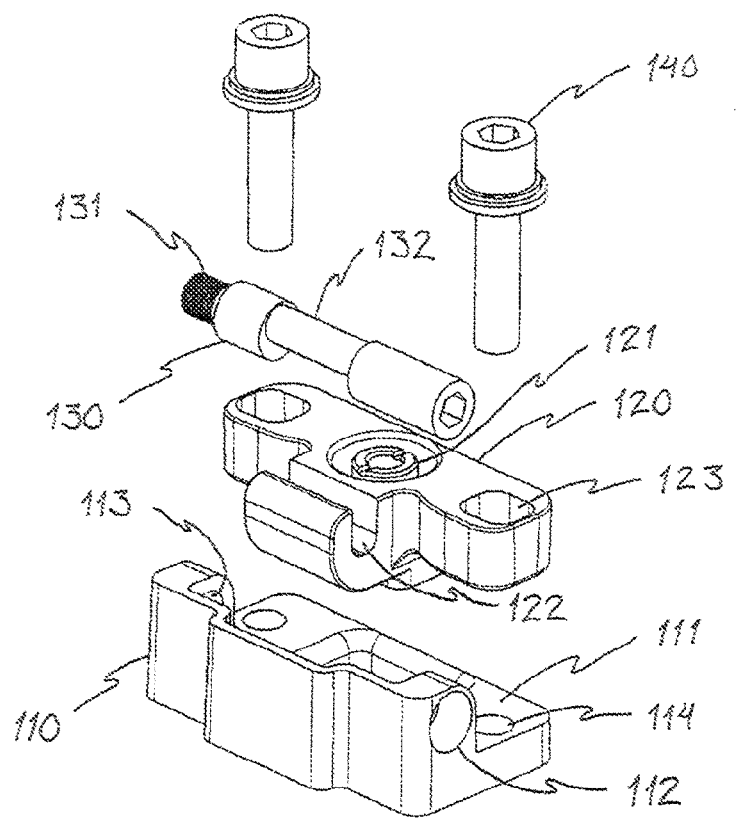
FIG. 2 illustrates an exploded perspective view of the device shown in FIG. 1.

FIG. 1 illustrates a perspective view of a device for adjusting a position of an optical component according to an embodiment of the invention. The device 100 comprises a first member which is a frame 110. The frame 110 comprises a sliding surface 111. The frame 110 acts as a base to which other components of the device 100 are attachable directly or via various fastening means. The flat sliding surface 111 can be seen better in FIG. 2, which illustrates an exploded perspective view of the device 100.

The device 100 also comprises a second member which is a slide 120. The slide 120 is arranged to be movable relative to the frame 110 in contact with the sliding surface 111. An optical component (not shown) is attachable to the slide 120 via attaching means. In this exemplary illustration the attaching means is a ferrule 121 to which an end of an optical fibre (not shown) is attachable.

The device 100 further comprises an elongated third member which is a shaft 130. The shaft 130 is arranged in an operational connection with the frame 110 and the slide 120. The frame 110 comprises two apertures 112 situated at the opposing edges of the frame 110 through which apertures 112 the shaft 130 is movable. One end of the shaft 130 comprises a helical thread 131 formed along a portion of the shaft 130. One of the two apertures 112 comprises a corresponding helical groove 113 so that the shaft 130 is movable through the apertures 112 by rotating the shaft 130 around its rotation axis. The rotation axis is substantially parallel to the sliding surface 111.

The shaft 130 comprises an eccentric part 132 which is eccentric in relation to the rotation axis of the shaft 130. The slide 120 comprises a groove 122 inside which the eccentric part 132 is arranged to be movable. In this exemplary illustration the length of the eccentric part 132 is substantially the same as the length of the groove 122. The eccentric part 132 has a circular cross-section, and the bottom of the groove 122 has a corresponding semi-circular cross-section. Thus, the eccentric part 132 and the groove 122 are arranged to be movable relative to each other without any substantial free play between them.

By rotating the shaft 130 in a clockwise or counterclockwise direction, the slide 120 moves relative to the frame 110 in a direction of the rotation axis of the shaft 130. At the same time the slide 120 moves in an oscillating manner relative to the frame 110 in a direction perpendicular to said rotation axis. The slide 120 can thus be moved relative to the frame 110 in a plane of the sliding surface 111 simply by rotating the shaft 130.

The device 100 comprises also two screws 140 for fastening the frame 110 in connection with the slide 120 so that the slide 120 stays in contact with the sliding surface 111. The screws 140 are connected through oversized apertures 123 of the slide 120 to apertures 114 of the frame 110. The apertures 123 of the slide 120 are oversized so that they allow the slide 120 to be movable relative to the frame 110 along the sliding surface 111. The screws 140 are hexagonal socket-head screws.

Figures 3, 4:
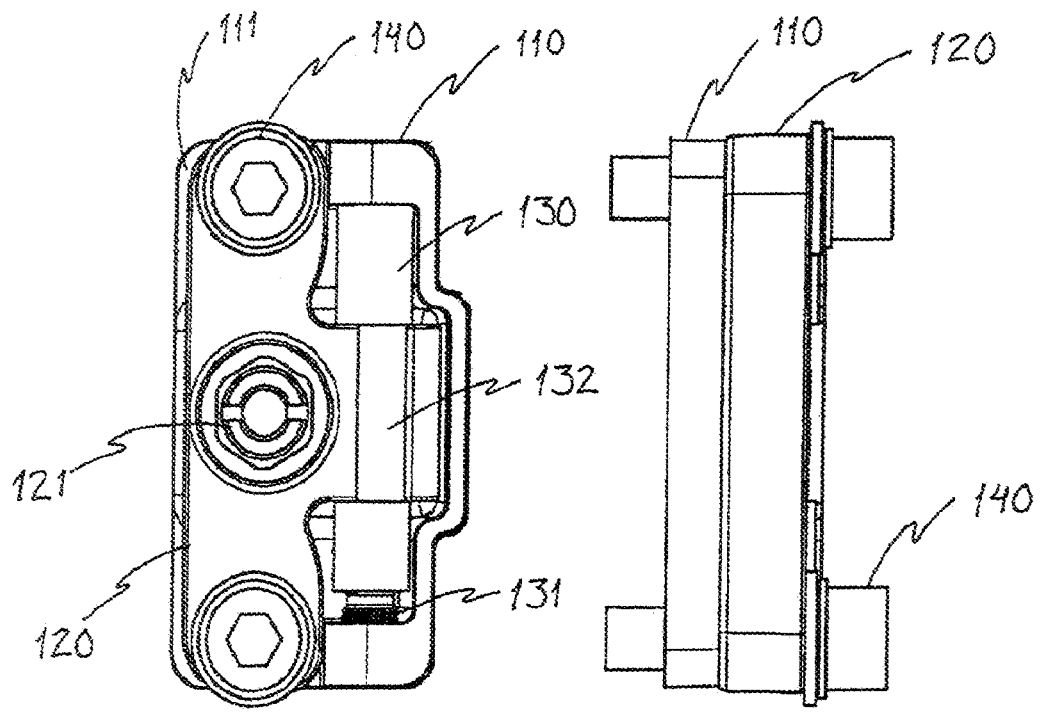
FIG. 3 illustrates a schematic top view of the device shown in FIG. 1.
FIG. 4 illustrates a schematic side view of the device shown in FIG. 1.

A schematic top view and a schematic side view of the device shown in FIG. 1 are illustrated in FIGS. 3 and 4, respectively.

Figure 5:
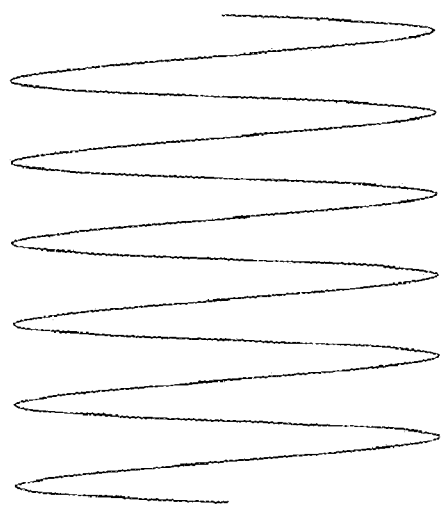
FIG. 5 illustrates an exemplary adjustment range of a device according to an embodiment of the invention.

FIG. 5 illustrates an exemplary adjustment range of a device according to an embodiment of the invention. By rotating the shaft 130 back and forth the optical component which has been attached to the slide 120 follows this sinusoidal path. The form of the path depends, for example, on the dimensions of the shaft 130 and on the form of the helical thread 131.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A device for adjusting a position of an optical component in two directions, comprising:
   a first member (110) having a flat sliding surface (111),
   a second member (120) arranged to be movable relative to the first member in contact with said sliding surface, to which second member the optical component is attachable, and
   an elongated third member (130) arranged in an operational connection with the first and the second member so that the second member is movable relative to the first member in a direction of a rotation axis of the third member when the third member is being moved in the direction of its rotation axis, said rotation axis being substantially parallel to the sliding surface of the first member,
   characterised in that the third member comprises an eccentric part (132) which is eccentric in relation to the rotation axis of the third member, the eccentric part being arranged in an operational connection with the second member so that the second member is movable relative to the first member in a direction perpendicular to said rotation axis when the third member is being rotated around its rotation axis.

2. A device according to claim 1, characterised in that the first member (110) comprises an aperture (112) through which the third member (130) is movable.

3. A device according to claim 2, characterised in that the third member (130) comprises a helical thread (131) formed along a portion of the third member and that the aperture (112) comprises a corresponding helical groove (113) so that the third member is movable through the aperture by rotating the third member around its rotation axis.

4. A device according to claim 3, characterised in that the angle of thread is in the range of 0.05 to 10 degrees.

5. A device according to claim 1, characterised in that the device comprises an electric motor for rotating the third member (130) in the clockwise and counterclockwise direction.

6. A device according to claim 1, characterised in that the second member (120) comprises a groove (122) inside which the eccentric part (132) is arranged to be movable.

7. A device according to claim 6, characterised in that the length of the eccentric part (132) is substantially the same as the length of the groove (122).

8. A device according to claim 1, characterised in that the eccentric part (132) has a circular cross-section.

9. A device according to claim 1, characterised in that the second member (120) comprises attaching means (121) for attaching the optical component to the second member.

10. A device according to claim 1, characterised in that the device comprises fastening means (140) for fastening the first member (110) in connection with the second member (120) so that the second member stays in contact with the sliding surface (111).

11. A device according to claim 1, characterised in that the second member (120) is a slide.

12. A device according to claim 1, characterised in that the third member (130) is a shaft.

13. Use of a device according to claim 1 for adjusting the position of an end of an optical fibre.

14. A method for adjusting a position of an optical component in two directions with a device comprising a first member (110) having a flat sliding surface (111), a second member (120) arranged in contact with said sliding surface, and an elongated third member (130) arranged in an operational connection with the first and the second member so that the second member is movable relative to the first member, the method comprising:

adjusting the optical component in a direction of a rotation axis of the third member by moving the third member in the direction of its rotation axis, the optical component being attached to the second member, and the rotation axis being substantially parallel to the sliding surface of the first member, characterised in that the method comprises adjusting the optical component in a direction perpendicular to said rotation axis by rotating the third member around its rotation axis and by converting the rotational motion into a linear motion via an eccentric part (132) which is eccentric in relation to the rotation axis of the third member.

15. A device according to claim 2, characterised in that the device comprises an electric motor for rotating the third member (130) in the clockwise and counterclockwise direction.

16. A device according to claim 3, characterised in that the device comprises an electric motor for rotating the third member (130) in the clockwise and counterclockwise direction.

17. A device according to claim 4, characterised in that the device comprises an electric motor for rotating the third member (130) in the clockwise and counterclockwise direction.

18. A device according to claim 2, characterised in that the second member (120) comprises a groove (122) inside which the eccentric part (132) is arranged to be movable.

19. A device according to claim 3, characterised in that the second member (120) comprises a groove (122) inside which the eccentric part (132) is arranged to be movable.

20. A device according to claim 4, characterised in that the second member (120) comprises a groove (122) inside which the eccentric part (132) is arranged to be movable.

* * * * *